US012792650B2

(12) United States Patent
Bischof et al.

(10) Patent No.: US 12,792,650 B2

(45) Date of Patent: *Nov. 10, 2026

(54) PRIMING GENERATIVE AI MODEL LEVERAGING DIRECTED ACYCLIC GRAPH-DRIVEN NOTEBOOK ENVIRONMENT

(71) Applicant: Hex Technologies Inc., San Francisco, CA (US)

(72) Inventors: Bryan Edward Bischof, Berkeley, CA (US); Jared Lorince, Morton Grove, IL (US); Caitlin Royden Colgrove, San Francisco, CA (US); Barry Ryan McCardel, San Fransisco, CA (US); Glen Takahashi, San Jose, CA (US); Adam Joseph Storr, San Francisco, CA (US)

(73) Assignee: Hex Technologies Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/208,436

(22) Filed: May 14, 2025

(65) Prior Publication Data

US 2025/0272325 A1 Aug. 28, 2025

Related U.S. Application Data

(63) Continuation of application No. 18/426,109, filed on Jan. 29, 2024, now Pat. No. 12,332,931.

(Continued)

(51) Int. Cl.

*G06F 16/334* (2025.01)
*G06F 8/30* (2018.01)

(Continued)

(52) U.S. Cl.

CPC ............ *G06F 16/3344* (2019.01); *G06F 8/30* (2013.01); *G06F 16/316* (2019.01); *G06F 16/3329* (2019.01); *G06F 40/40* (2020.01)

(58) Field of Classification Search

CPC ...... G06F 16/3344; G06F 8/30; G06F 16/316; G06F 16/3329; G06F 40/40; G06F 16/243; G06F 16/9024

See application file for complete search history.

(56) References Cited

U.S. PATENT DOCUMENTS 11,880,381 B1 * 1/2024 Al-Alusi ............... G06F 16/248
12,393,618 B2 * 8/2025 Ananthanarayanan ...................... G06F 16/3329

(Continued)

OTHER PUBLICATIONS

PCT International Search Report and Written Opinion, PCT Application No. PCT/US24/13382, May 8, 2024, 15 pages.

(Continued)

*Primary Examiner* — Angelica Ruiz
(74) *Attorney, Agent, or Firm* — Fenwick & West LLP

(57) ABSTRACT

An application receives a natural language query from a user into a cell of a notebook environment and responsively determines a set of precedent cells and a profile of the user. The application determines a portion of the data warehouse graph that corresponds to the natural language query. The application primes the large language model with priming context that is based on the portion of the data warehouse graph that corresponds to the natural language query, the precedent cells from which the code cell depends, and the profile of the user, the priming resulting in a primed large language model. The application inputs the natural language query into the primed large language model and receives, as output from the large language model, a response to the natural language query. The application provides the response to the natural language query to the user.

20 Claims, 9 Drawing Sheets

800

Related U.S. Application Data

(60) Provisional application No. 63/526,419, filed on Jul. 12, 2023, provisional application No. 63/442,692, filed on Feb. 1, 2023.

(51) Int. Cl.

| | |
|---|---|
| ***G06F 16/31*** | (2019.01) |
| ***G06F 16/3329*** | (2025.01) |
| ***G06F 40/40*** | (2020.01) |

(56) References Cited

U.S. PATENT DOCUMENTS

| | | | | |
|---|---|---|---|---|
| 2010/0241644 | A1 | 9/2010 | Jackson et al. | |
| 2015/0169758 | A1 | 6/2015 | Assom et al. | |
| 2016/0358102 | A1 | 12/2016 | Bowers et al. | |
| 2019/0068401 | A1* | 2/2019 | Johnsen | H04L 49/358 |
| 2019/0213284 | A1 | 7/2019 | Anand et al. | |
| 2019/0317961 | A1 | 10/2019 | Brener et al. | |
| 2019/0379731 | A1* | 12/2019 | Johnsen | H04L 49/358 |
| 2020/0174756 | A1 | 6/2020 | Cerar et al. | |
| 2021/0232873 | A1 | 7/2021 | Kothari et al. | |
| 2021/0326532 | A1 | 10/2021 | Taylor | |
| 2021/0357762 | A1 | 11/2021 | Clement et al. | |
| 2022/0414228 | A1 | 12/2022 | Difonzo et al. | |
| 2024/0419698 | A1* | 12/2024 | Ananthanarayanan | G06F 16/3329 |
| 2025/0370999 | A1* | 12/2025 | He | G06F 16/2433 |

OTHER PUBLICATIONS

European Patent Office, European Search Report and Opinion, European Patent Application No. 24750799.9, Apr. 7, 2026, 11 pages.

United States Office Action, U.S. Appl. No. 18/426,098, Apr. 22, 2026, 18 pages.

Unknown. "Hex 2.0: Reactivity, Graphs, and a little bit of Magic," Wayback Machine, date unknown, pp. 1-10, [Online] [Retrieved on Apr. 6, 2026] Retrieved from the Internet <URL: https://web.archive.org/web/20221103203602>.

Unknown. "Introducing: Dataframe SQL," date unknown, pp. 1-8, [Online] [Retrieved on Apr. 6, 2026] Retrieved from the Internet <URL: https://web.archive.org/web/20221116061411>.

* cited by examiner

500

600

Variable explorer

Variables currently in kernel scope.

| NAME | TYPE | VALUE |
|---|---|---|
| x | int | 1 |
| y | int | 3 |
| penguins | DataFr... | Species, inta ... |
| ax | Axios$... | <unknown> |

*FIG. 6*

PRIMING GENERATIVE AI MODEL LEVERAGING DIRECTED ACYCLIC GRAPH-DRIVEN NOTEBOOK ENVIRONMENT

CROSS REFERENCE TO RELATED APPLICATIONS

This application is a continuation of U.S. application Ser. No. 18/426,109, filed Jan. 29, 2024, which claims the benefit of U.S. Provisional Application No. 63/526,419, filed Jul. 12, 2023, and U.S. Provisional Application No. 63/442,692, filed Feb. 1, 2023, which are incorporated by reference in its entirety.

TECHNICAL FIELD

Aspects of this disclosure generally relate to the field of cell-driven notebook generation. More specifically, some aspects of this disclosure relate to a supervised machine learning approach to code generation in a directed acyclic graph (DAG) cell environment, and some aspects of this disclosure relate to efficient use of a large language model (LLM) by leveraging a DAG cell environment in relation to resolving natural language user input queries.

BACKGROUND

Generative AI (Artificial Intelligence) is a supervised machine learning approach to receiving a natural language command and outputting what is instructed based on usage of a LLM. For example, a generative AI command may include a natural language command to "write a story about turtles and Fred," and a machine learning model trained using example stories about turtles and about human males might take that input and output a three-paragraph story in response. Generative AI has limitations in that the inputs are self-contained, and inferences are made solely from self-contained training examples. Therefore, where inputs depend on external data, generative AI will not produce an accurate response because it will not have the dependent data as part of its input.

Moreover, when querying a generative AI model, inefficiencies exist both from a network usage perspective and from a computational efficiency perspective. A typical interaction with a generative AI model begins with a query, where the generative AI model will respond with an answer based on context it has so far. A user iterates with the generative AI model, providing more context. This involves back-and-forth network communications, as well as expensive computation on a large universe with limited context, resulting in massive waste of network and compute resources at scale.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure

FIG. 6 illustrates a data structure showing context information from a kernel for input into a generative AI model with a generative AI request.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
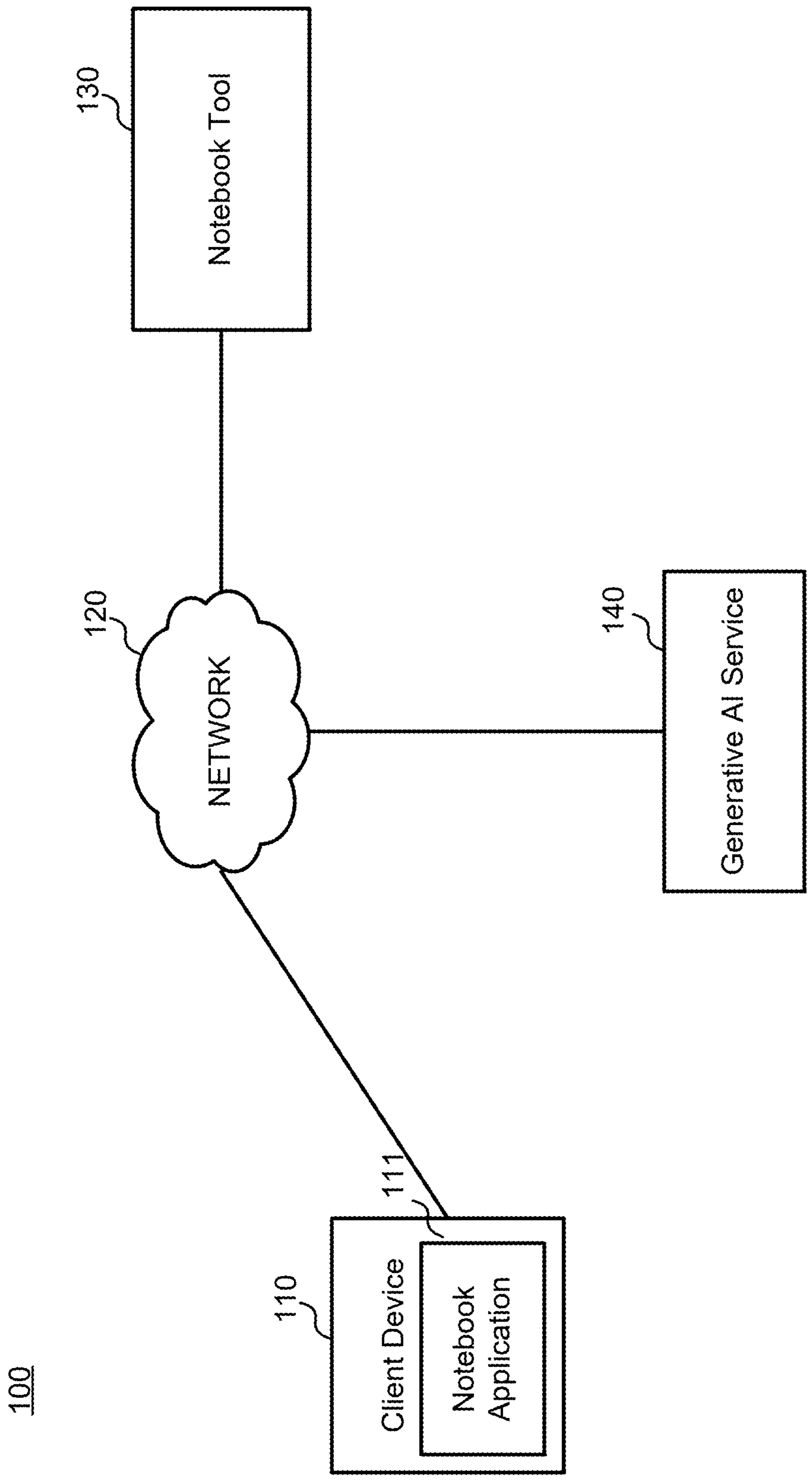
(FIG. 1 illustrates one embodiment of a system environment for implementing a notebook tool.

Figure (FIG. 1 illustrates one embodiment of a system environment for implementing a notebook tool. As depicted in FIG. 1, environment 100 includes client device 110 with notebook application 111 installed thereon, network 120, notebook tool 130, and generative AI service 140. Client device 110 may be any device having a user interface useable to interact with a notebook via notebook application 111 and/or notebook tool 130. Exemplary client devices may include personal computers, laptops, tablets, smartphones, and so on. While only one client device 110 is depicted, any number of client devices may be used. Multiple client devices may be used at a same time to access and otherwise collaborate on a same notebook.

Notebook application 111 may be a dedicated application installed on client device 110 for using a notebook. Notebook application 111 may be installed directly or indirectly from notebook tool 130 (e.g., downloaded from notebook tool 130; downloaded from an application store; from a hard drive having installation code, and so on). The notebook may in whole or in part be stored in the cloud (e.g., using notebook tool 130) and/or local to client device 110. Notebook application 111 may be a browser through which a notebook may be accessed from notebook tool 130. The term notebook, as used herein, may refer to an application that accepts inputs in any number of code languages (e.g., python, SQL (Structured Query Language), Jupyter, and so on) and/or non-code languages (e.g., spreadsheet format, text format, etc.) and/or other UI-based operations (e.g., interacting with a UI to generate a pivot table, to create boolean filters to filter a data set, or to perform any other activity, where the interaction causes the notebook to automatically generate code to perform needed activities or computations). The inputs may each form individual cells, or may command combinations of inputs that together form cells. Cells may be connected in a DAG structure, with directed edges pointing between one another that reflect dependencies among cells. The DAG structure and further details about notebook operation are discussed in further detail with reference to FIGS. 2-6.

Network 120 may be a data communication channel between client device 110 and notebook tool 130. The data communication channel may be any channel usable to transmit communications between these entities, such as the Internet, a local area network, a wireless network, a short-range communications network, and so on. Network 120 may facilitate communication between any number of client devices and external servers and services beyond those depicted in environment 100.

Notebook tool 130 may be a cloud-based provider that stores notebooks and provides functionality described herein with respect to notebooks. All functionality described herein with respect to notebook application 111 may be performed by notebook tool 130, and all functionality described herein with respect to notebook tool 130 may be performed by notebook application 111. Distributed processing where some activity described is performed by notebook 111 and other activity described is performed by notebook tool 130 is implied as within the scope of what is described even where processing is only described with respect to one of the two entities herein. Further details about the functionality of notebook tool 130 are described below with respect to FIG. 2.

Generative AI service 140 provides access to a trained machine learning model for generating responses to natural language queries (e.g., generating code where a natural language query requests computer language code having specified characteristics). Generative AI service 140 may be a service external to notebook tool 130 (as depicted), or may be integrated as part of notebook tool 130 (not depicted).

Figure 2:
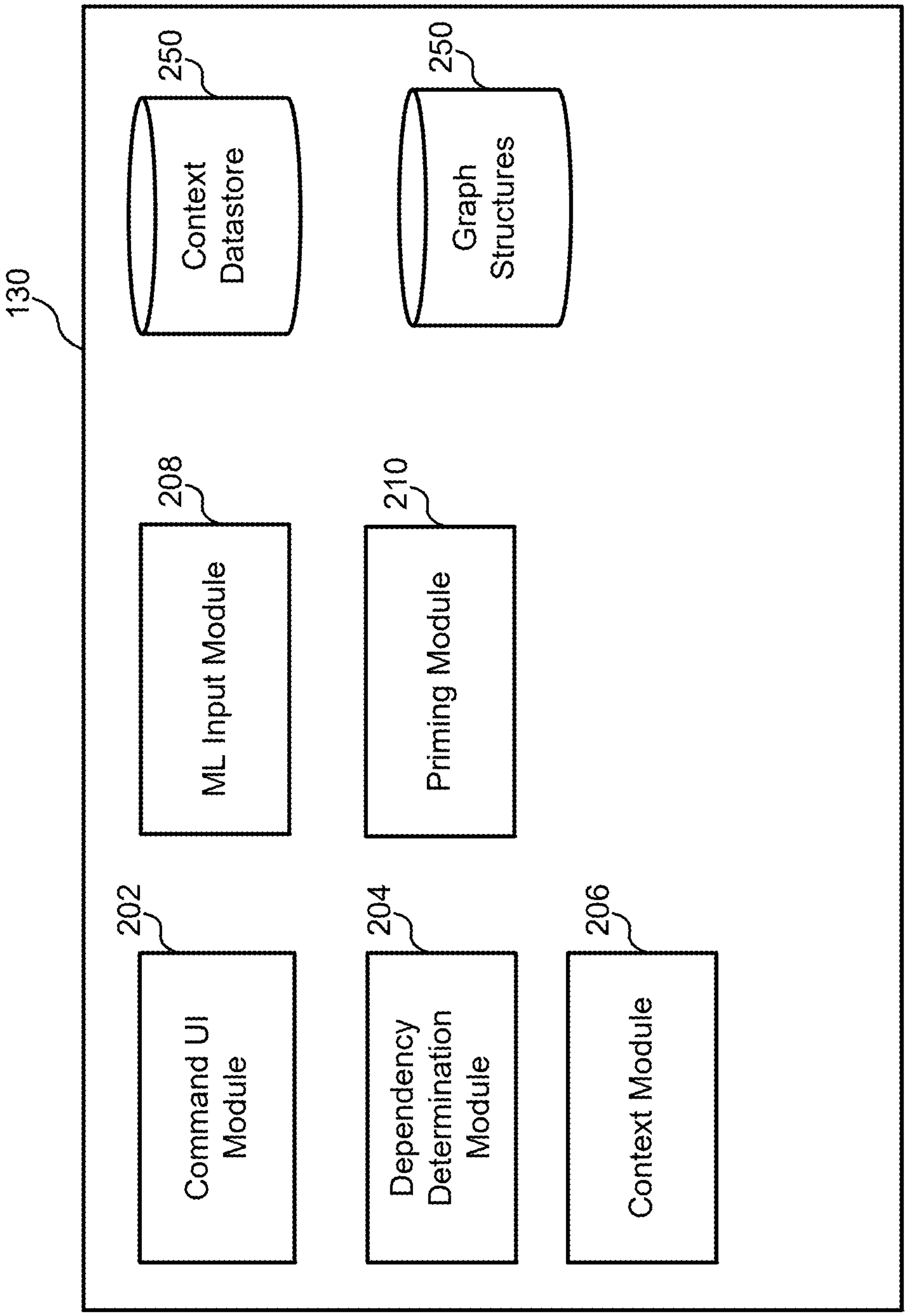
FIG. 2 illustrates one embodiment of modules of the notebook tool.

FIG. 2 illustrates one embodiment of modules of the notebook tool. As depicted, notebook tool 130 includes command UI (user interface) module 202, dependency determination module 204, context module 206, ML (machine learning) input module 208, priming module 210, context datastore 250, and graph structures 250. The modules and datastores depicted in FIG. 2 are merely exemplary; any number of modules and/or datastores may be used to achieve the functionality disclosed herein. Moreover, as mentioned above, while the modules and datastore are illustrated and described with respect to notebook tool 130, some or all of the operation of these modules and/or datastores may part of notebook application 111 operating on client device 110, thus accommodating on-device operation in whole, or distributed processing between notebook application 111 and notebook tool 130.

Figure 3:
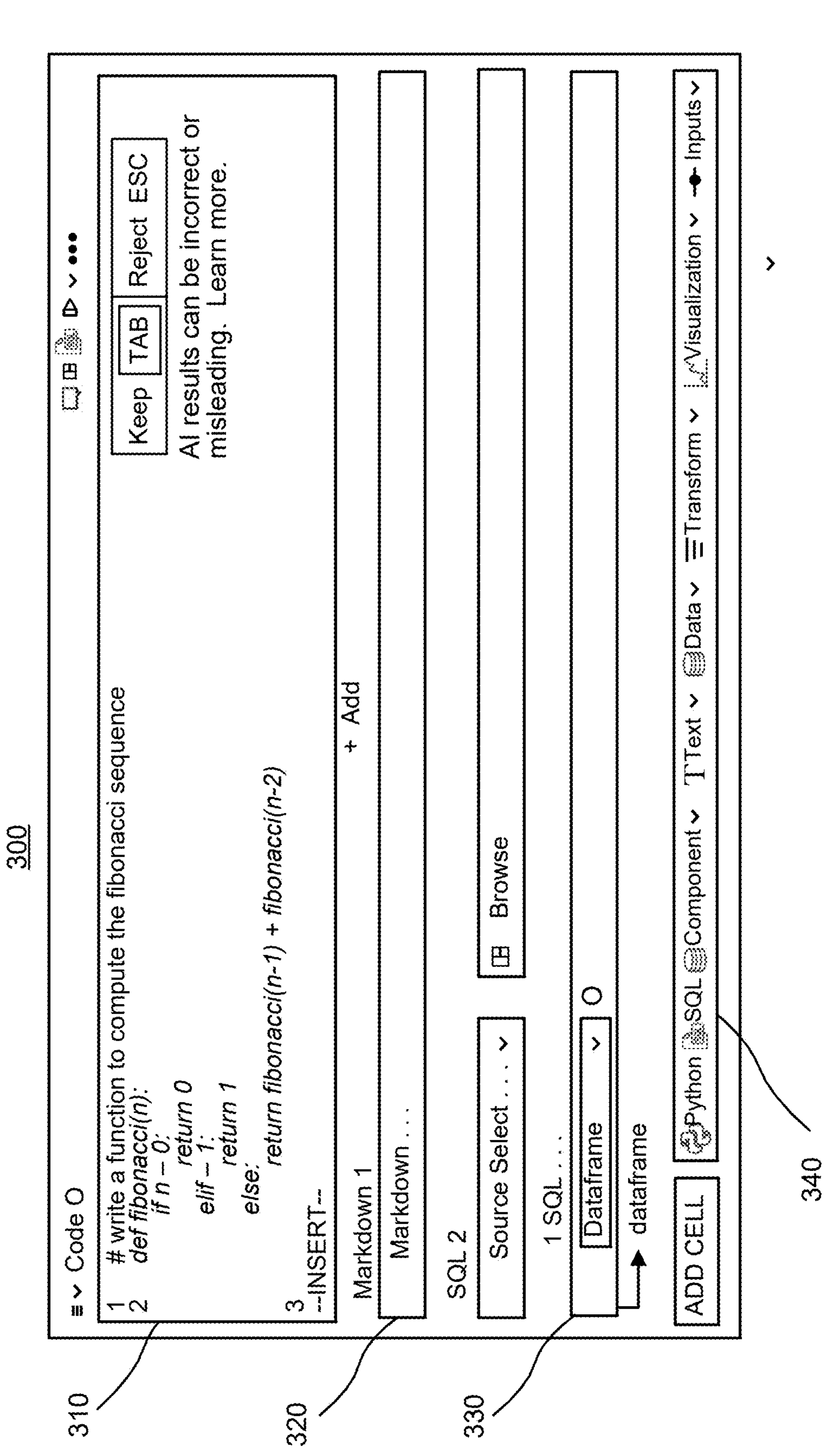
FIG. 3 illustrates an exemplary user interface for generating a cell using generative AI, in accordance with an embodiment.

Command UI module 202 receives inputs in cells of a notebook. Turning for the moment to FIG. 3, FIG. 3 illustrates an exemplary user interface for generating a cell using generative AI, in accordance with an embodiment. FIG. 3 also illustrates a user interface for generating a cell in other manners. As shown in FIG. 3, user interface 300 includes multiple cells each having their own interface, where interface 310 is for generating code, interface 320 is for generating markdown (e.g., tables, text, etc.), and interface 330 is for generating SQL. These are merely exemplary; any number of cells may be generated or part of user interface 300, and the cells may use any language (other code languages like Python, natural language, spreadsheet, or any other language is within the scope of the disclosure).

Cells may be generated from scratch or may be generated using pre-existing components. To use pre-existing components, component option 340 may be selected, which may lead to a library of components. A user may select from the library a component, and responsive to doing so, command UI module 202 will add the component as a cell to user interface 300. To generate cells from scratch, in an embodiment, a user may add text to the cell's associated interface (e.g., manually type code, SQL, markdown, python, and so on).

In an embodiment, command UI module 202 may receive a natural language command to automatically generate code. For example, as depicted in interface 310, command UI module 202 receives a command to "write a function to compute the Fibonacci sequence". While this is depicted as a command for a given code type, this natural command may appear in any interface of user interface 300 for generating a cell. Responsive to receiving such a command, command UI module 202 may pass as input to a supervised machine learning model (e.g., generative AI service 140) the command, and may receive as output from the supervised machine learning model a response which command UI module 202 uses to form the cell. As depicted in FIG. 3, this response is a coded function for computing the Fibonacci sequence, which was automatically provided by the supervised machine learning model. The activity of generating code in FIG. 3 is merely exemplary. Any natural language command to return information is equally applicable wherever the example of code generation is used herein.

In a notebook structure having many cells that have myriad dependencies, simply passing input text for automatic code generation (or any other context for automatic population of data or text for a cell) into a supervised machine learning model will result in inaccuracies where the cell implicated by the request depends on other cells, and the context of those other cells is not also passed along to the supervised machine learning model. To this end, in addition to passing along a command, dependency determination module 204 determines dependencies of the cell, and command UI module 202 may additionally pass the dependencies and/or the cells on which the command cell depends to the supervised machine learning model (or the values of variables).

Figure 4:
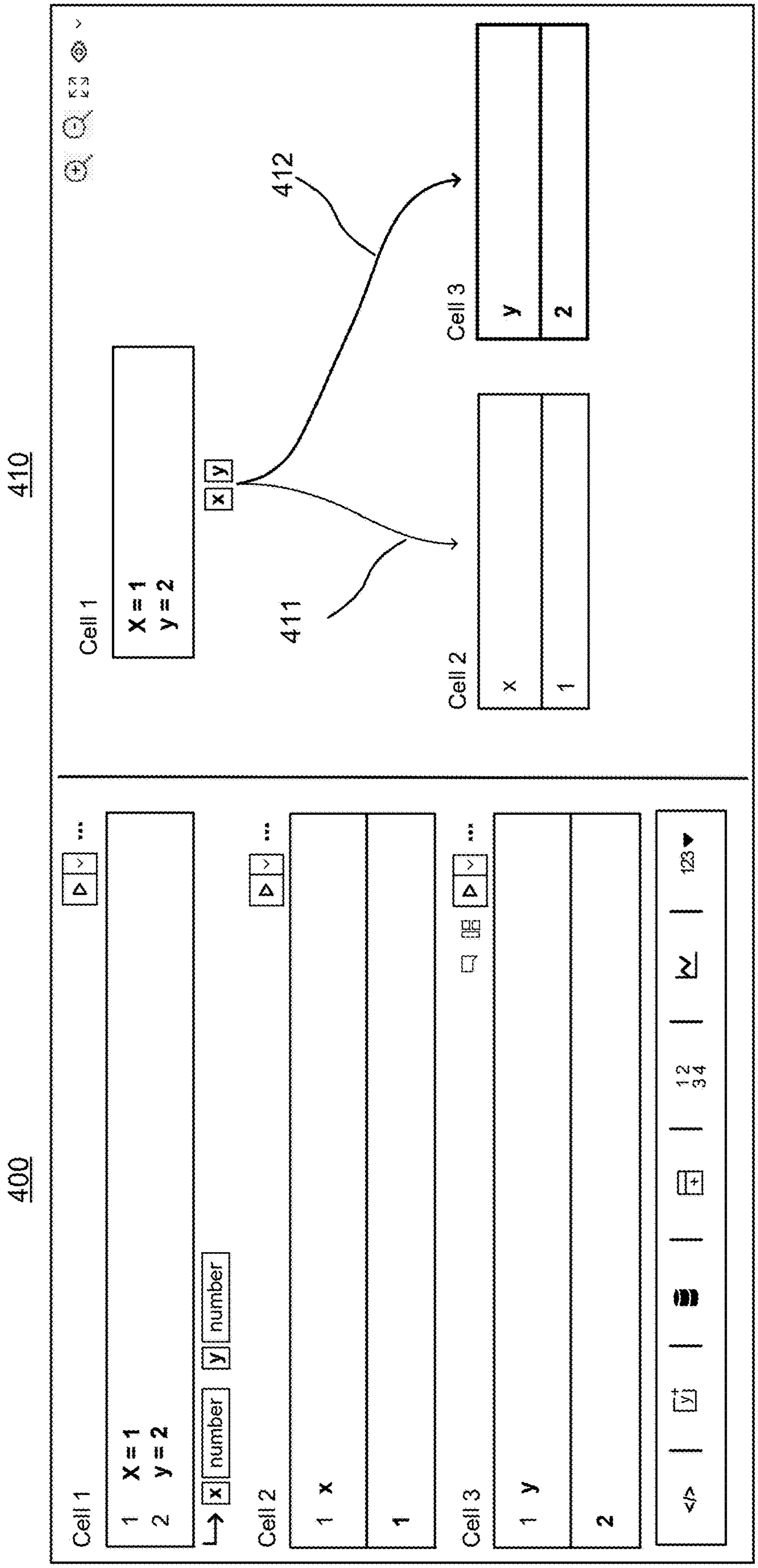
FIG. 4 illustrates exemplary cells and an exemplary graph representing those cells.

To illustrate graph dependencies in a DAG used by notebook tool 130, we turn to FIG. 4. FIG. 4 illustrates exemplary cells and an exemplary graph representing those cells. User interface 400 shows cell 1, which defines x=1 and y=2. Cell 2 has a value of x. Cell 3 has a value of y. Notebook tool 130 automatically determines dependencies of cell 2 and cell 3 to cell 1, because the values of variables in those cells are defined in cell 1. Accordingly, shown in graph 410, notebook tool 130 generates directed edge 411 between cell 1 and cell 2, and directed edge 412 between cell 1 to cell 3, the directed edges each pointing downward because the dependency flow goes downward from cell 1. That is, whenever cell 1 has a value that changes in x or y, the corresponding directed edge causes notebook tool 130 to responsively recalculate ells 2 and/or 3 (depending on which of x, y, or both is updated) to update those values.

In order to successfully implement a DAG structure in a notebook environment, all directed edges between cells must flow in only one direction (to prevent an infinite loop). For example, a DAG is broken in a scenario where a notebook has a first cell that defines a=1 and b=a+1, and a next cell that defines b=1, and a=b+1, because the cells are interdependent. To avoid an infinite loop in such a scenario, notebook tool 130 employs linear ordering, where whichever cell is introduced first in the notebook controls, and backward-looking edges are removed. Thus, in the prior example, a directed edge would be drawn from the first cell to the next cell, and no directed edge would be drawn back to the first cell from the next cell (or if such an edge were to exist, it would be removed).

In order to successfully implement a DAG structure in a notebook environment, the ordering must be deterministic. For example, consider a scenario where there are two cells that each define a variable X. The first cell defines X=1, and the second cell defines X=2. A function of print(X) appears in a third cell. For the DAG to be successfully implemented such that what is printed from the print(X) function is reliable and repeatable, linear ordering is once again used between cells calling a same variable. Thus, in this example, notebook tool 130 would draw a directed edge from X=1 to print(X), and would also draw a directed edge from X=2 to print(X). However, because of linear ordering, the first and second cells will always be run in the same order, thus always resulting in the print(X) example reliably using the value of 2 for X.

With a DAG structure established for a notebook, when a cell is run, dependency determination module 204 may determine, using directed edges of the graph structure, a set of precedent cells from which the cell depends. That is, as a default, before or in connection with running the cell, dependency determination module 204 may traverse directed edges of the graph structure. The traversal may result in one or more of running each precedent cell that is connected to the cell to be run by a directed edge and/or returning an identification of each precedent cell. Where each precedent cell is run, values for cells (e.g., values of variables within cells, values determined by functions within cells, and so on) may be written to context datastore 250. Further detail about use of context datastore 250 is described in further detail below with respect to context module 206.

In an embodiment, running dependency determination module 204 may occur as a default when a cell is run. Dependency determination module 204 may, optionally, additionally run stale cells relating to the cell when the cell is run. The term "stale", as used herein, refers to a state of a given cell any of the following is true: (1) the cell has not yet been run in a current kernel session; (2) an upstream cell has been edited but the given cell not been re-run; (3) an upstream cell has been run more recently than the given cell itself; and (4) an upstream cell has become stale. For example, returning to the example of cell 1, which defines x=1 and y=2, cell 2 having a value of x, and cell 3 having a value of y, if cell 1 was run more recently than cells 2 or 3, cells 2 and 3 are stale. Stale upstream ancestor cells (that is, cells that are pointed to by a directed edge from a more recently run cell) may be re-run along with precedent cells from which a code cell depends.

Figure 5:
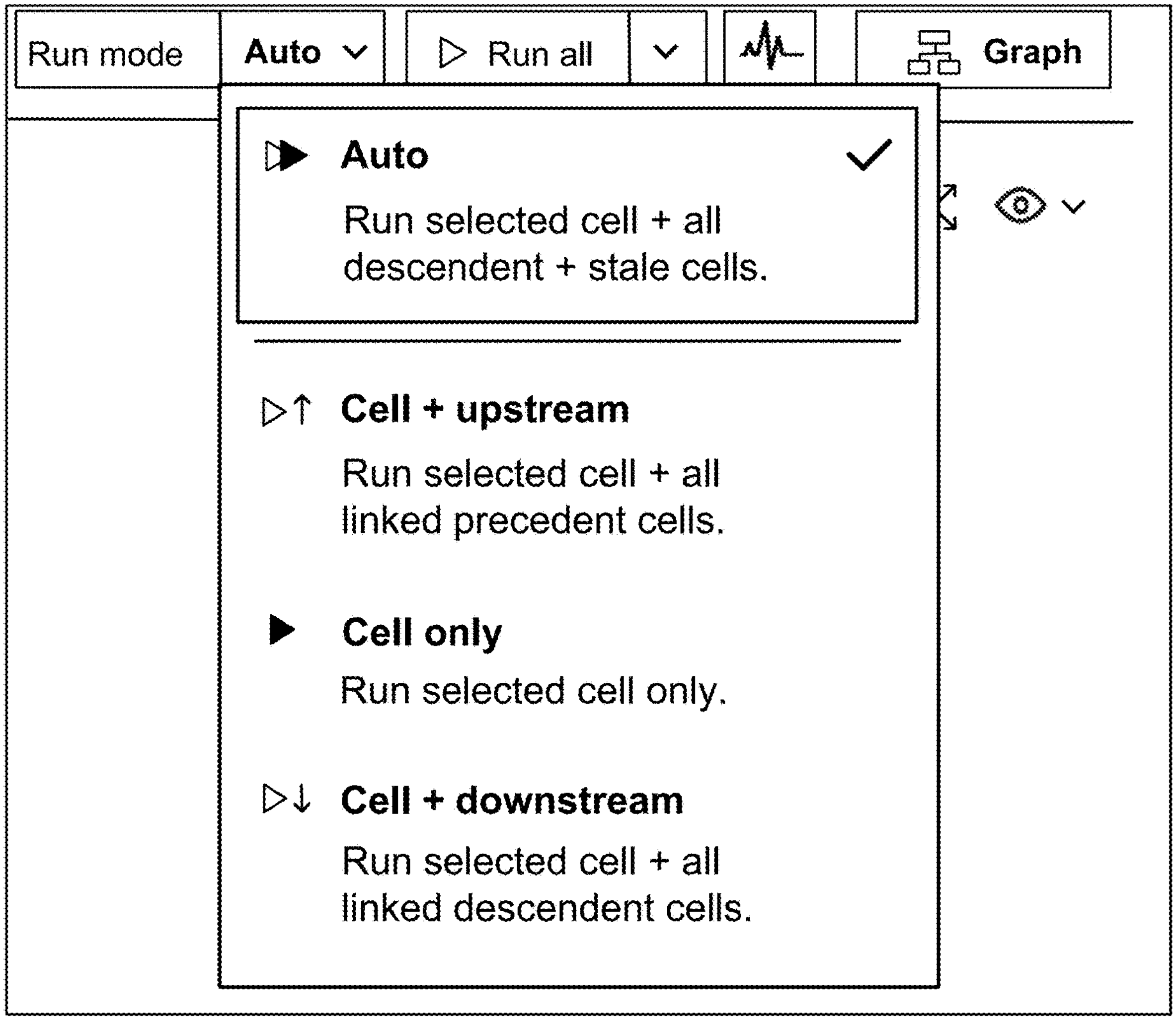
FIG. 5 illustrates an exemplary user interface for customizing which cells are run in connection with a generative AI request.

Turning for the moment to FIG. 5, FIG. 5 illustrates an exemplary user interface for customizing which cells are run in connection with a generative AI request. User interface 500 shown in FIG. 5, however, may be used in connection with cells that are not involved with a generative AI request. As depicted in user interface 500, a default may be set as described, where when a selected cell is run, its descendent cells and respective stale cells are run. Other options, however, are available. Application 111 may enable a user to select running a selected cell and its linked precedent cells, just the cell itself, or the cell and its linked descendent cells, at the user's option. A selected option may be incorporated by application 111 as a new default operation for a given cell or for all cells until a new default is selected by a user.

Context module 206 keeps track of data stored (contextual schema) in the kernel. The data stored in the kernel may reflect variable values, cell values, cell states (e.g., stale/not stale), cell dependencies, and so on. Context module 206 may also keep track of data frames (e.g., tables) and subcomponents therein (e.g., values of data sets within a data frame), as well as other local files. An example of context is shown in FIG. 6, where FIG. 6 illustrates a data structure showing context information from a kernel for input into a generative AI model with a generative AI request. The context shown in context schema 600 show that a value of x after cells were last run is 1, for y it is 3, for a data frame of "penguins" there are various values (e.g., headers), and so on. Other auxiliary information and metadata may be tracked, such as data type.

Returning to FIG. 2, in connection with generating code using natural language inputs, a natural language command may be input into a code cell. In such a scenario, ML input module 208 may provide as input to a supervised machine learning model the natural language command, as well as values from the set of precedent cells pertaining to the code. ML input module 208 may determine the values from the set of precedent cells based on processing performed by dependency determination module 204 and/or context module 206 in any manner discussed above. Additional contextual schema from context module 206 may be additionally input into the supervised machine learning model. ML input module 208 receives, as output from the supervised machine learning model, generated code, and updates the code cell to include the generated code (e.g., an example is shown in FIG. 3, where code to compute the Fibonacci sequence is depicted in interface 310). This equally applies to generation of any other type of cell, such as a natural language command to generate a chart based on data stored in a data warehouse or any other type of command beyond code generation.

After a code cell (or any other type of cell) is generated (and other cells are run), a user may wish to save the notebook, or a notebook may be saved automatically. Responsive to detecting a save operation, notebook tool 130 may generate a save file for the cells by aggregating project-level metadata and metadata for each cell of the plurality of cells, while omitting outputs from each cell of the plurality of cells. That is, the output of the cells is not part of the save files, and only the code for each code cell is saved. Optionally, data connection credentials, secrets, and other sensitive items are also omitted. By selectively omitting these features, the save file allows for a project to be synchronized in other spaces (e.g., github) while avoiding integration issues that might otherwise prevent publication (e.g., version comparison issues) and reducing overall storage space that would otherwise be dedicated to storing the output.

While this disclosure often refers to using generative AI to write code where the cell involved in the request has dependencies, wherever code cells or cells involving other UI-based operations are mentioned in this manner, this is generalizable to any other cell having dependencies. It is noted that UI-based operations may have dependencies where they form cells that reference variables in code cells. Cells having UI-based operations may in turn be depended upon.

Priming module 210 handles additional aspects of processing natural language queries using generative AI. These additional aspects can be used in conjunction with some or all of the prior-mentioned modules and/or their associated functionality as mentioned with respect to FIG. 2. Priming module 210 primes generative AI service 140 with context relating to a query and its associated cells, a user generating a query, and the data warehouse being searched. By priming generative AI service 140, priming module 210 achieves efficiency gains on both bandwidth usage and computational expense by reducing or eliminating recursive prompts to arrive at a result using generative AI service 140, in that priming module 210 reduces a search space for satisfying a query input into generative AI service 140 to a point that a result is either immediately discernible, or is discernible with a minimal number of follow-up queries. Notebook tool 130 is uniquely positioned to perform effective priming because it has access to a complete contextual picture across organizations and data warehouses and prior interactions between these entities, enabling graphical modeling to prepare priming context efficiently and effectively.

In some embodiments, priming module 210 receives a natural language query from a user. The natural language query may be received, for example, into a cell of a notebook environment, into other areas of a notebook housing the notebook environment, in a page (e.g., of a website or application) that leads to the notebook environment, and the like. This may be a natural language query for performance of any function, such as generating code in manners described with respect to command UI module 202. Other possible functions may be to retrieve data, prepare a visualization (e.g., a chart representative of data retrieval), or any other function. Receiving the natural language query, whether or not for generating code, may be performed in manners described above with respect to command UI module 202. The natural language query implicates retrieval of data from a specified data warehouse (e.g., a postgres data warehouse).

In response to receiving the natural language query, priming information is generated based on data processing from three graphs. The first graph is a notebook graph structure (e.g., the aforementioned DAG) that represents dependencies between the natural language query cell and other cells in the notebook environment, which may be determined using dependency determination module 204 and context module 206, as described in the foregoing. In an embodiment, each node in the notebook graph structure is a computational step of a cell within the notebook environment. The edges are the directed edges described in the foregoing. Nodes in the notebook graph can be connected, but are not necessarily connected (e.g., where dependencies do not exist between nodes that are connected in a logical sense, but where there is no formal dependency).

The second graph is a user graph structure. The user graph structure applies to a universe of users, such as users within a same organization (e.g., team, company, etc.). The user graph structure may be a sub-graph within a larger graph (e.g., the graph structure can be limited to just a team within an organization, or can be organization-wide, where each team has its own sub-graph within an organization's user graph). Within that universe, nodes are populated for each user (e.g., user nodes each representative of a different user). Nodes are also populated for each notebook graph structure associated with a user within the organization (e.g., DAG nodes are populated for each project that a given user of an organization has worked on). Edges are populated within the user graph structure between user nodes and DAG nodes to which given user nodes have ownership. Ownership is not necessarily a one-to-one relationship between users and DAGs, and so many users may have edges connecting to a same DAG node. Policies may be established by an organization that define ownership. For example, ownership may be defined by a policy to include any combination of creators of a notebook project resulting in a DAG and contributors to existing notebook projects. In an embodiment, edges within the user graph structure can be annotated with ownership type (e.g., creator versus contributor). Priming module 210 may build the user graph structure by crawling notebook projects within an organization for owners (as defined by a policy of the organization), and by building nodes for each owner and project, along with connective edges.

The third graph is a data warehouse graph, which models data within a data warehouse. Priming module 210 may build a data warehouse graph for each data warehouse connected to one or more notebook projects of an organization. Within data warehouses exist schemas, which include tables of data information. Within the tables are organized columns within the information. Priming module 210 may designate a node within the data warehouse graph for each column within a data warehouse. Priming module 210 may add an edge between nodes of the data warehouse graph wherever the columns represented by the nodes are mutually queried in a cell of a notebook project. The edges may be annotated with metadata indicating information, such as a manner in which a mutual query occurred (e.g., an explicit join command between columns; a more generic query that mutually queries two or more columns, etc.). The edges may also be annotated with metadata indicating owners and/or projects in which a mutual query occurred.

These three graphs enable priming module 210 to, based on the contents of the natural language query, prime a generative AI model to have context for the query. In particular, using the directed edges of a notebook graph structure, priming module 210 may determine a set of precedent cells from which the cell including the natural language query depends. From the set of precedent cells, priming module 210 may determine what queries have already been made, what code and other content is already captured in the notebook project, what variables and values are already known, and so on. With this information, priming module 210 may prime the generative AI model with context that avoids results that are redundant, and with results that utilize work that is already done (e.g., avoiding spending computing resources to obtain information already known). These three graphs may be stored in graph structures 250.

Moreover, using edges of the user graph structure populated based on activities of users relative to the notebook environment, priming module 210 may determine a profile of the user (that is, a collection of projects on which the user is an owner, and information therefrom). The profile of the user may include any information derivable from the user graph structure, such as a programming language a user typically uses, a type of result the user is querying for (e.g., at this stage in a notebook project (as determined using the notebook graph structure), does the user request a chart or more code?), the data resources that the user has queried in the past (e.g., which data warehouses, and which resources within those data warehouses that the user has specifically queried), code used to perform data analysis on results of queries (e.g., chart generation), and so on. The profile of the user may additionally include information relating to any other user with ownership of the notebook project in question, and may additionally include information relating to an overall team of which the user is a part (e.g., profiling behavior of the team instead of or in addition to the individual, where the individual's behavior may be biased more heavily than the team's behavior). Priming module 210 may generate and/or update profiles of users on any basis, such as periodically, when predefined time points are reached, and/or when a trigger is detected (e.g., responsive to detecting new activity by a user).

Priming module 210 may provide priming context to the generative AI model, which may be a large language model. The large language model may include a trove of embeddings representative of searchable data, the embeddings representing the searchable data in latent space. In order to prime the generative AI model, priming module 210 may generate one or more recommendations to the large language model of how to structure a search within its searchable data using context from the three graphs. That is, prior to querying generative AI service 130, priming module 210 performs analytics within the environment of notebook tool 130 to determine the context to recommend to generative AI service 130.

Generally speaking, priming module 210 receives a natural language query from a user using notebook application 111, though other inputs may alternatively or additionally be received by priming module 210 (e.g., clicking, selecting, highlighting, and so on—for example, a user may select a part of a chart and may responsively receive a plurality of prompted options, each option corresponding to a further query to be performed on that portion of the chart). Priming module 210 determines, using the notebook graph structure dependency information (e.g., using dependency determination module 204) and context information (e.g., using context module 206), from which priming module 210 determines known context and values that should be omitted from any query provided to generative AI service 130. That is, certain parameters that form a part of what the user is querying for may already be known from prior runs by notebook application 111 and therefore need not be searched again (e.g., as determined from precedent cells).

Priming module 210 also determines, using the user graph structure, profile information of the user, from which priming module 210 determines a likely intent of the user that narrows the universe of what is queried in the natural language query. That is, from the profile information, priming module 210 may determine parameters that are at least a threshold likelihood to be preferred by a user. For example, where the user is commanding that code be generated, priming module 210 may determine from the profile that the user codes in language C 93% of the time, and may compare that to a threshold minimum probability of 85% and determine that only code in language C should be searched for to the exclusion of other languages by the LLM. Priming module 210 also determines, using the data warehouse graph, one or more likely columns within the data warehouse that the user intends to act on as part of the query. This may be similarly performed using a profile of the user, where priming module 210 determines that the user typically performs semantic searches having common qualities. For example, a profile reflects that a user queries specific columns or types of columns frequently (or has done so in at least a most recent threshold number of days). The priming module 210 may determine from this profile information at least a threshold likelihood that a user intends to perform a similar semantic search (e.g., to query columns of the type typically searched).

In some embodiments, in order to form predictions using each of these three graphs, priming module 210 may transform the natural language query into a vector of embeddings, and may determine (e.g., using an unsupervised machine learning model) portions of each of the three graphs that are similar to portions of the vector, where matching elements of each graph (e.g., having at least a threshold similarity and/or confidence score) are recommended to generative AI service 130 as likely areas within which a user is seeking a result. Additionally or alternatively, beyond vector similarity, explicit categorical feature search methods may be used, such as full-text search and/or collaborative filtering based searches in order to form predictions.

Through such use of priming module 210, the searchable data from the large language model be reduced from a huge universe of data available to the LLM using the priming context provided as a recommendation to the large language model. That is, the priming context may include parameters that must be present (e.g., I only code in this one language, so all other languages need not be searched), may include parameters that are already known (e.g., from the notebook graph structure graph analysis), and may include parameters about the user (e.g., the user prefers or has certain behavior traits that make some candidate results more likely than others to be useful or having at least a threshold likelihood that they are preferred by the user, and the more likely candidate results may be searched to the exclusion of the others), as predicted by priming module 210.

Yet further, priming module 210 may predict, using the priming context from the notebook graph structure and the user graph structure, portions of the data warehouse and actions therein that are relevant to the natural language query, and may provide those portions as part of the priming context to the large language model to the exclusion of other portions. For example, where the natural language query involves a join function, based on the user graph structure, priming module 210 may determine likelihoods that a user wishes to join certain columns represented in the data warehouse graph structure. By reducing the universe of data within the data warehouse to be analyzed by processing performed by a large language model, massive computational efficiency gains are achieved.

In some embodiments, two or more predictions relating to each of the graphs may be determined by priming module 210 as likely areas the user intends to search. In some embodiments, priming module 210 provides all of the predictions to generative AI service 130. In some embodiments, priming module 210 selects a subset (that is, at least one and less than all) of the set of predictions to provide as a recommendation to generative AI service 130.

In order to select the subset, priming module 210 may use form of tiebreaking tool. Tiebreaking may include multi-objective ranking (e.g., where each prediction is ranked on one or more metrics, and the highest ranking or highest rankings up to a threshold number of rankings are selected). Tiebreaking may include interleaving, where ranking is performed on two or more metrics, and where priming module 210 selects, on an alternating basis, a highest ranked prediction from each ranked list until a threshold maximum number of predictions for providing to generative AI service 130 is selected. Any other form of tiebreaking may be performed by priming module 210.

Priming module 210 transmits the priming context along with the natural language command (or a representation thereof) to the large language model, and receives a result from the large language model. Notebook application 111 may display the result to the user, and may provide for display options to accept the result, or to refine the query (e.g., if the result is not satisfactory. Responsive to the user accepting the result, notebook application 111 applies the result to the cell.

As an exemplary use case, the user may be a non-technical organization member that is using notebook tool 130 to determine a parameter relevant to a task, such as determining data storage used by each group within the organization within the last month. It is possible that a different member of the organization has run this search already. In an embodiment, no priming context is provided to generative AI service 140 when running this query, therefore resulting in a cold start scenario. In such a scenario, the non-technical organization member may input into a cell of a project within notebook application 111 "How much data storage was used by each group in my organization within the last month?". Generative AI service 140 may then return "Here's the definition of data storage. If you have a table of data storage usage by different members of your organization, you can query it using [process]". The user may then iterate with generative AI service 140, resulting in massive waste of network resources of network 120, and computational resources used by generative AI service 140.

Using priming module 210, priming module 210 primes generative AI service 140 with priming context including information about the user, the projects that the user and its organization tends to work on, and the data warehouse that has the information relevant to the user's query. This priming context enables generative AI service 140 to determine what the user is looking for, and where to find it. For example, the priming module 210 determines using the user graph structure that of projects made using notebook application 111 by this user, none of those projects have code and therefore determines that code should not be provided as a result. Similarly, using the user graph structure, priming module 210 determines that the user looks at certain dashboards showing data storage usage across the organization using notebook application 111, and determines a relevant data warehouse that may have the requested information. Priming module 210 may determine whether those already-retrieved dashboards already have information about data storage usage within the organization, and responsive to determining that this information is already within context or otherwise known, priming module 210 determines not to prime generative AI service 140, and instead signals to command UI module 202 to simply provide the requested information within the dashboard to the user as a result, thus entirely removing the need to provide a computationally expensive query to generative AI service 140.

Where priming module 210 does not determine that the requested information is within the dashboards, priming module 210 determines additional information to generate priming context. The additional information may include user profile information, such as other adjacent searches that the user tends to perform (e.g., requesting data migration volume by team within the organization over time in other cells of this project or in other projects represented in the user graph structure). Priming module 210 may, using user activity information within the user profile information, walk the data warehouse graph accordingly. For example, priming module 210 may walk areas of the data warehouse graph relating to data migration volume and determine that migration volume data is connected by edges within the data warehouse graph structure to server cluster data, which in turn is connected to data storage by team per server cluster. Priming module 210 may determine that the next step is to query data relating to storage within those server clusters.

Priming module 210, with this context, may determine to generate a new cell within the current notebook project of the user that queries the relevant tables showing storage data within storage clusters. As generative AI model 140 is designed to write queries (e.g., SQL queries, Python queries, R queries, and so on, as well as queries for chart generation) efficiently, priming module 210 may prime generative AI model 140 with the context of which data warehouse to query, what columns within that data warehouse to query, and how to organize the results (that is, organize based on metadata showing storage on a team-wide basis, and organize it by month). Priming module 210 receives a result of the query, which is a table populated into a next cell in the notebook project of the user showing storage data by team over the last month.

Command UI module 202 may receive a further natural language query that says "break this down team leader". Priming module 210 may determine the meaning of this vague query using the notebook graph structure, which based on the dependency graph, shows that what is being broken down is the data storage currently shown in the prior cell, but now indicating a team leader should be shown. Priming module 210 may again walk the data warehouse and may identify therein a table that maps teams to their team leaders. Priming module 210 may then command generative AI model 210 to add a new cell that queries performing a join command and returns the data. While a naïve approach would have, based on this further natural language query, generated a brand new query, this approach leverages data and context already within the notebook graph structure to identify a minimal step needed, from a computational use perspective, to obtain the answer.

Computing Machine Architecture

Figure 7:
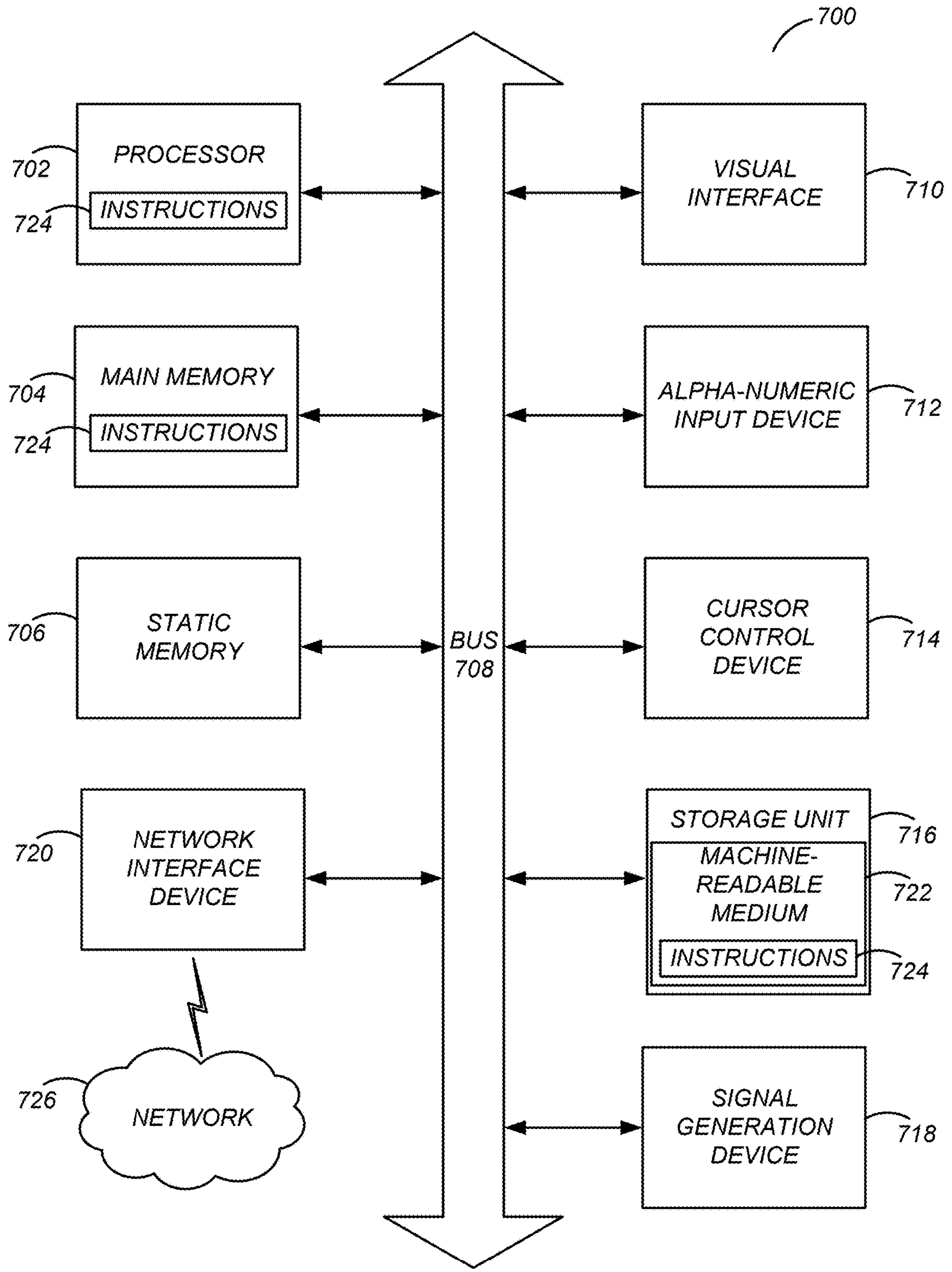
FIG. 7 is a block diagram illustrating components of an example machine able to read instructions from a machine-readable medium and execute them in a processor (or controller).

FIG. (FIG. 7 is a block diagram illustrating components of an example machine able to read instructions from a machine-readable medium and execute them in a processor (or controller). Specifically, FIG. 7 shows a diagrammatic representation of a machine in the example form of a computer system 700 within which program code (e.g., software) for causing the machine to perform any one or more of the methodologies discussed herein may be executed. The program code may be comprised of instructions 724 executable by one or more processors 702. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 724 (sequential or otherwise) that specify actions to be taken by that machine. Further, while only a single machine is illustrated, the term "machine" shall also be taken to include any collection of machines that individually or jointly execute instructions 724 to perform any one or more of the methodologies discussed herein.

The example computer system 700 includes a processor 702 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 704, and a static memory 706, which are configured to communicate with each other via a bus 708. The computer system 700 may further include visual display interface 710. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 710 may include or may interface with a touch enabled screen. The computer system 700 may also include alphanumeric input device 712 (e.g., a keyboard or touch screen keyboard), a cursor control device 714 (e.g., a mouse, a trackball, a joystick, a motion sensor, or other pointing instrument), a storage unit 716, a signal generation device 718 (e.g., a speaker), and a network interface device 720, which also are configured to communicate via the bus 708.

The storage unit 716 includes a machine-readable medium 722 on which is stored instructions 724 (e.g., software) embodying any one or more of the methodologies or functions described herein. The instructions 724 (e.g., software) may also reside, completely or at least partially, within the main memory 704 or within the processor 702 (e.g., within a processor's cache memory) during execution thereof by the computer system 700, the main memory 704 and the processor 702 also constituting machine-readable media. The instructions 724 (e.g., software) may be transmitted or received over a network 726 via the network interface device 720.

While machine-readable medium 722 is shown in an example embodiment to be a single medium, the term "machine-readable medium" should be taken to include a single medium or multiple media (e.g., a centralized or distributed database, or associated caches and servers) able to store instructions (e.g., instructions 724). The term "machine-readable medium" shall also be taken to include any medium that is capable of storing instructions (e.g., instructions 724) for execution by the machine and that cause the machine to perform any one or more of the methodologies disclosed herein. The term "machine-readable medium" includes, but not be limited to, data repositories in the form of solid-state memories, optical media, and magnetic media.

Exemplary Processes

Figure 8:
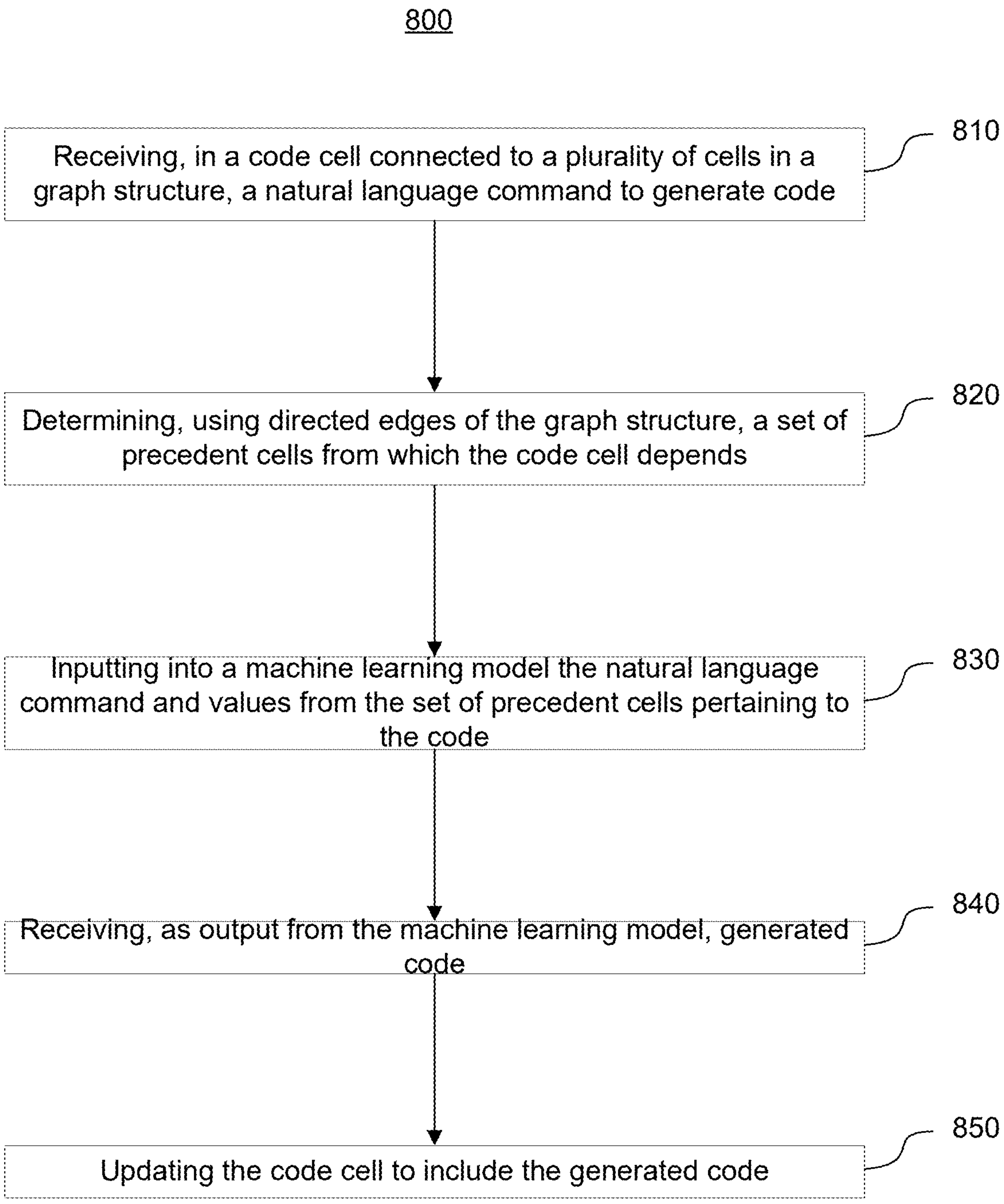
FIG. 8 is an exemplary flowchart illustrating a process for automatically generating code based on a natural language query in a notebook environment, in accordance with an embodiment.

FIG. 8 is an exemplary flowchart illustrating a process for automatically generating code based on a natural language query in a notebook environment, in accordance with an embodiment. Process 800 may be run by notebook application 111 and/or notebook tool 130 having one or more modules execute computer-readable instructions, though for convenience and brevity it is recited from the perspective of notebook tool 130 only. Process 800 begins with notebook tool 130 receiving 810 in a code cell connected to a plurality of cells in a graph structure a natural language command to generate code (e.g., using command UI module 202). Notebook tool 130 determines 820, using directed edges of the graph structure, a set of precedent cells from which the code cell depends (e.g., using dependency determination module).

Notebook tool 130 inputs 830 into a machine learning model the natural language command and values from the set of precedent cells pertaining to the code (e.g., using ML input module 208 and optionally also using context module 206). Notebook tool 130 receives 840, as output from the machine learning model, generated code, and updates 850 the code cell to include the generated code.

Figure 9:
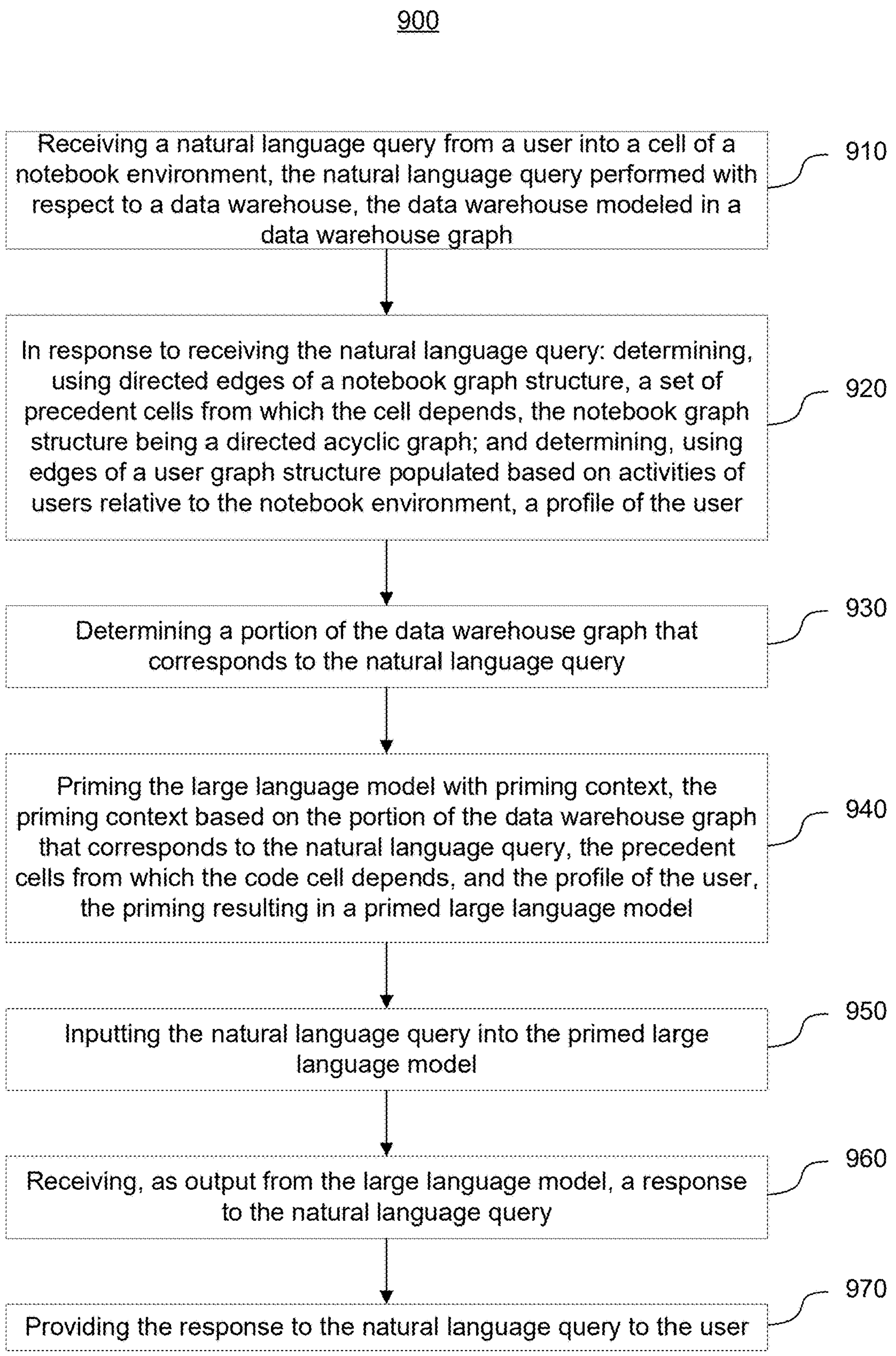
FIG. 9 is an exemplary flowchart illustrating a process for priming a large language model with context for resolving a natural language query in a notebook environment, in accordance with an embodiment.

FIG. 9 is an exemplary flowchart illustrating a process for priming a large language model with context for resolving a natural language query in a notebook environment, in accordance with an embodiment. Process 900 may be run by notebook application 111 and/or notebook tool 130 having one or more modules execute computer-readable instructions, though for convenience and brevity it is recited from the perspective of notebook tool 130 only. Process 900 begins with notebook tool 130 receiving 910 a natural language query from a user into a cell of a notebook environment, the natural language query performed with respect to a data warehouse, the data warehouse modeled in a data warehouse graph. In response to receiving the natural language query, notebook tool 130 performs 920 determining, using directed edges of a notebook graph structure, a set of precedent cells from which the cell depends, the notebook graph structure being a directed acyclic graph, and determining, using edges of a user graph structure populated based on activities of users relative to the notebook environment, a profile of the user.

Notebook tool 130 determines 930 a portion of the data warehouse graph that corresponds to the natural language query, and primes 940 the large language model with priming context (e.g., using priming module 210), the priming context based on the portion of the data warehouse graph that corresponds to the natural language query, the precedent cells from which the code cell depends, and the profile of the user, the priming resulting in a primed large language model. Notebook tool 130 inputs 950 the natural language query into the primed large language model and receives 960, as output from the large language model, a response to the natural language query. Notebook tool 130 provides 970 the response to the natural language query to the user.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating code for cells having dependencies shown in a DAG using generative AI through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

receiving a natural language query from a user into a cell of a notebook environment, the natural language query performed with respect to a data warehouse, the data warehouse modeled in a data warehouse graph;

in response to receiving the natural language query:

determining a set of precedent cells from which the cell depends; and identifying a profile of the user;

determining a portion of the data warehouse graph that corresponds to the natural language query;

priming a large language model with priming context, the priming context based on the portion of the data warehouse graph that corresponds to the natural language query, the precedent cells from which the cell depends, and the profile of the user, the priming resulting in a primed large language model;

inputting a query that is based on the natural language query into the primed large language model, the query omitting known data obtained by previous runs of the set of precedent cells; and providing a response to the natural language query to the user.

2. The method of claim 1, wherein the data warehouse is modeled by:

generating a column node for each column of each table within the data warehouse; and generating edges between column nodes that are mutually queried.

3. The method of claim 2, wherein column nodes are mutually queried when they are called together by a cell.

4. The method of claim 2, wherein column nodes are mutually queried when they are together part of a join command.

5. The method of claim 2, wherein the edges between the column nodes indicate information about how they were mutually queried.

6. The method of claim 5, wherein the information is pointed to by one or more nodes of a user graph structure for given users that performed an act in which the column nodes were mutually queried.

7. The method of claim 1, wherein determining the set of precedent cells from which the cell depends comprises determining values from the set of precedent cells using a sequential ordering dictated by directed edges of a notebook graph structure.

8. The method of claim 1, wherein determining the profile of the user comprises determining historical queries in historical projects performed by the user that relate to the natural language query.

9. A non-transitory computer-readable medium comprising memory with instructions encoded thereon that, when executed, cause one or more processors to perform operations, the instructions comprising instructions to:

receive a natural language query from a user into a cell of a notebook environment, the natural language query performed with respect to a data warehouse, the data warehouse modeled in a data warehouse graph;

in response to receiving the natural language query:

determine a set of precedent cells from which the cell depends; and identify a profile of the user;

determine a portion of the data warehouse graph that corresponds to the natural language query;

prime a large language model with priming context, the priming context based on the portion of the data warehouse graph that corresponds to the natural language query, the precedent cells from which the cell depends, and the profile of the user, the priming resulting in a primed large language model;

input a query that is based on the natural language query into the primed large language model, the query omitting known data obtained by previous runs of the set of precedent cells; and provide a response to the natural language query to the user.

10. The non-transitory computer-readable medium of claim 9, wherein the data warehouse is modeled by:

generating a column node for each column of each table within the data warehouse; and generating edges between column nodes that are mutually queried.

11. The non-transitory computer-readable medium of claim 10, wherein column nodes are mutually queried when they are called together by a cell.

12. The non-transitory computer-readable medium of claim 10, wherein column nodes are mutually queried when they are together part of a join command.

13. The non-transitory computer-readable medium of claim 10, wherein the edges between the column nodes indicate information about how they were mutually queried.

14. The non-transitory computer-readable medium of claim 13, wherein the information is pointed to by one or more nodes of a user graph structure for given users that performed an act in which the column nodes were mutually queried.

15. The non-transitory computer-readable medium of claim 9, wherein the instructions to determine the set of precedent cells from which the cell depends comprise instructions to determine values from the set of precedent cells using a sequential ordering dictated by directed edges of a notebook graph structure.

16. The non-transitory computer-readable medium of claim 9, wherein the instructions to determine the profile of the user comprise instructions to determine historical queries in historical projects performed by the user that relate to the natural language query.

17. A system comprising:

memory with instructions encoded thereon; and one or more processors that, when executing the instructions, are caused to perform operations comprising:

receiving a natural language query from a user into a cell of a notebook environment, the natural language query performed with respect to a data warehouse, the data warehouse modeled in a data warehouse graph;

in response to receiving the natural language query:

determining a set of precedent cells from which the cell depends; and identifying a profile of the user;

determining a portion of the data warehouse graph that corresponds to the natural language query;

priming a large language model with priming context, the priming context based on the portion of the data warehouse graph that corresponds to the natural language query, the precedent cells from which the cell depends, and the profile of the user, the priming resulting in a primed large language model;

inputting a query that is based on the natural language query into the primed large language model, the query omitting known data obtained by previous runs of the set of precedent cells; and providing a response to the natural language query to the user.

18. The system of claim 17, wherein the data warehouse is modeled by:

generating a column node for each column of each table within the data warehouse; and generating edges between column nodes that are mutually queried.

19. The system of claim 18, wherein column nodes are mutually queried when they are called together by a cell.

20. The system of claim 18, wherein column nodes are mutually queried when they are together part of a join command.

* * * * *